United States Patent
Hartwell et al.

(10) Patent No.: US 9,677,934 B2
(45) Date of Patent: Jun. 13, 2017

(54) BACKGROUND CORRECTION IN EMISSION SPECTRA

(71) Applicant: Thermo Electron Manufacturing Limited, Altrincham, Cheshire (GB)

(72) Inventors: Stephen Hartwell, Cambridge (GB); Nigel Cooper Bailey, Altrincham (GB)

(73) Assignee: Thermo Electron Manufacturing Limited, Cambridge (GB)

( * ) Notice: Subject to any disclaimer, the term of this patent is extended or adjusted under 35 U.S.C. 154(b) by 205 days.

(21) Appl. No.: 14/470,875

(22) Filed: Aug. 27, 2014

(65) Prior Publication Data

US 2015/0062577 A1   Mar. 5, 2015

(30) Foreign Application Priority Data

Aug. 28, 2013   (GB) .................................. 1315284.8

(51) Int. Cl.
| | | |
|---|---|---|
| *G01J 3/36* | (2006.01) | |
| *G01J 3/02* | (2006.01) | |
| *G01J 3/443* | (2006.01) | |
| *G01J 3/28* | (2006.01) | |

(52) U.S. Cl.
CPC ............... *G01J 3/0297* (2013.01); *G01J 3/28* (2013.01); *G01J 3/443* (2013.01)

(58) Field of Classification Search
CPC .. G01J 3/0297; G01J 3/28; G01J 3/443; H01J 49/426; H01J 49/005; H01J 49/0027; H01L 27/00
USPC ......................... 356/307; 250/2.1; 702/85–95
See application file for complete search history.

(56) References Cited

U.S. PATENT DOCUMENTS

| | | | |
|---|---|---|---|
| 5,121,337 A * | 6/1992 | Brown ................. | G01N 21/274 250/339.12 |
| 5,789,754 A | 8/1998 | Cathey et al. | |
| 6,564,114 B1 | 5/2003 | Toprac et al. | |
| 7,468,790 B2 | 12/2008 | Sogan et al. | |
| 7,768,639 B1 | 8/2010 | Chan et al. | |
| 2004/0114139 A1* | 6/2004 | Florek ...................... | G01J 3/02 356/328 |
| 2005/0283058 A1* | 12/2005 | Choo-Smith ........ | A61B 5/0088 600/315 |
| 2009/0014635 A1 | 1/2009 | Neitsch | |
| 2009/0086205 A1 | 4/2009 | Grun et al. | |

FOREIGN PATENT DOCUMENTS

| | | |
|---|---|---|
| CN | 101692045 A | 4/2010 |
| JP | 59221626 A | 12/1984 |

* cited by examiner

*Primary Examiner* — Hina F Ayub
(74) *Attorney, Agent, or Firm* — A.J. Gokcek

(57) ABSTRACT

A method for deriving a background-corrected portion of a measured optical emission spectrum comprising the steps of identifying two or more background correction points from the portion of the measured emission spectrum; deriving a background correction function fitted to the identified background correction points, and applying the background correction function to the portion of the measured emission spectrum so as to produce a background-corrected portion of the emission spectrum, wherein the background correction points are identified from the measured data points by consideration of the gradients between the measured data points.

17 Claims, 4 Drawing Sheets

BACKGROUND CORRECTION IN EMISSION SPECTRA

FIELD OF THE INVENTION

This invention relates to the field of optical emission spectroscopy, and in particular to spectral data processing to provide background-corrected portions of spectral emission data. It may be applied, for example, in inductively coupled plasma or microwave optical emission spectrometry.

BACKGROUND OF THE INVENTION

Inductively coupled plasma and microwave induced plasma optical emission spectroscopy (ICP-OES and MIP-OES respectively) are analytical techniques for determining the concentration of elements in a sample. A sample solution is injected into a plasma source, the temperature of which vaporises the sample, destroys any chemical bonds, ionises atoms and causes electronic excitation of the atoms and ions. A plasma spectrum consists of a continuum background and discrete spectral lines at wavelengths characteristic of any element contained in the sample. The intensity of any given spectral line is proportional to the concentration of the element in the sample and quantitative assessment of element concentration is then based upon a measurement of the intensity of light at a wavelength which is characteristic of the element.

A problem which exists in this and other analytical techniques involving emission spectra is that a continuum background can distort the shape of the spectral lines making an accurate assessment of element concentration difficult. Typical conventional techniques for providing some form of background correction are discussed in "ICP in Analytical Atomic Spectrometry", Montaser & Golightly, VCH, 1987, section 6.6, and in "Median Filtering for Removal of Low-Frequency Background Drift", Alvin W. Moore, James W. Jorgenson, Analytical Chemistry 1993, 65, 188-191. The simplest and a relatively unreliable technique is for the user to guess the wavelength value of one or two background points and use these wavelength values to apply a background correction in the determination of a concentration estimate. This initial choice of wavelength is typically used for all subsequent analyses of samples. Background correction is achieved at any particular wavelength of interest by linear interpolation between the background points. However this technique is time consuming and requires a relatively skilled technician to select suitable background points.

Similar problems exist in infra-red, gas chromatography, liquid chromatography and ultraviolet analytical instruments where changes in conditions affect the measurements made by the instrument.

Against this background the present invention has been made.

SUMMARY OF THE INVENTION

The present invention provides in a first aspect a method for deriving a background-corrected portion of a measured emission spectrum comprising the steps of identifying two or more background correction points from the portion of the measured emission spectrum, deriving a background correction function fitted to the identified background correction points, and applying the background correction function to the portion of the measured emission spectrum so as to produce a background-corrected portion of the emission spectrum; wherein the portion of measured emission spectrum comprises measured data points which consist of a series of n intensity values $I_n$, at discrete wavelengths or values corresponding to wavelength, $\lambda_n$, the series extending from a first measured data point to a last measured data point, and the background correction points are identified from the measured data points by the following steps:

identifying a first background correction point as the first measured data point;

calculating the gradients $G_m$ of straight lines between the background correction point just identified and each subsequent measured data point in the series;

identifying a next background correction point as the measured data point which lies on the straight line which has the minimum gradient of all the calculated gradients $G_m$;

if the background correction point just identified does not lie at the last measured data point, repeat the procedure from step (2) until it does.

The method of the invention is applied to data points within a portion of the measured emission spectrum and the following description considers only those data points. Each portion of the measured emission spectrum comprises measured data points which consist of a series of n intensity values $I_n$, at discrete wavelengths or values corresponding to wavelength, $\lambda_n$, the series extending from a first measured data point to a last measured data point. The number of points, n, within each portion may differ from one portion to another. The measured emission spectrum may be in a form in which the values corresponding to wavelength are stored and manipulated as wavelengths, or as frequency, distance, pixel number, memory bin number, or some other numerical value.

The portion of the measured emission spectrum may be found manually by the user, or automatically. If only a single spectral line needs to be background corrected, selecting the first and last data points manually can give improved results for that spectral line. In this case, first and last data points for the portion of the emission spectrum are selected by the user and the method of the invention determines a background correction function from the selected portion of the emission spectrum. Generally however, preferably the portion of the measured emission spectrum is found using the following automated procedure.

The measured emission spectrum is analysed to find all peaks in intensity which lie above a predetermined intensity level and which comprise a minimum number of measured data points thereby being a predetermined spectral width. Some or all of the peaks thus found may then be chosen. Preferably peaks are chosen on the basis of where in the spectrum of measured wavelengths or values corresponding to wavelength they lie, so that peaks corresponding to chosen elements may be selected. Each such peak selected comprises a number of measured data points, and these together with a number of adjacent measured data points either side of the peak is selected to be a portion of the measured emission spectrum. The number of adjacent measured data points either side of the peak may be chosen on the basis of a fixed predetermined number, or by analysis of the intensities of the adjacent points, so as to select additional points which include signal minima, at least one minima at each side of the peak. Still more preferably the number of adjacent measured data points either side of the peak is chosen so as to include at least one signal minima at each side of the peak, and one or more data points beyond the signal minima. Hence the portion of the emission spectrum is identified from a larger set of measured spectral data by a method of peak detection.

Having selected a portion of the measured emission spectrum, the method starts by considering a first point in the portion of the measured emission spectrum, and then subsequent points, until reaching a last data point in the portion of the measured emission spectrum. The first data point may be the point corresponding to the lowest wavelength or value corresponding to wavelength in the portion of measured emission spectrum, in which case the last data point is the point corresponding to the highest wavelength or value corresponding to wavelength in the portion of measured emission spectrum. Conversely, the method of the invention may be worked by taking the first data point to be the point corresponding to the highest wavelength or value corresponding to wavelength in the portion of measured emission spectrum, in which case the last data point is the point corresponding to the lowest wavelength or value corresponding to wavelength in the portion of measured emission spectrum.

The background correction points are identified as follows. The first background correction point, $BC_1$ is identified as the first measured data point. The next background correction point $BC_2$ is determined to be a data point in the selected portion of measured emission spectrum at which a minimum gradient occurs, the gradient being the gradient of a straight line between the first background correction point and any other subsequent data point in the selected portion of measured emission spectrum.

If the background correction point $BC_2$ is not the last data point in the selected portion of measured emission spectrum, one or more additional background correction points are then determined. A next background correction point $BC_3$ is determined as a data point in the selected portion of measured emission spectrum at which a minimum gradient occurs, the gradient being the gradient of the line between the second background correction point $BC_2$ and any other subsequent data point in the selected portion of measured emission spectrum. Subsequent data points are data points which lie between the second background correction point and the last point; data points preceding the last background correction point $BC_2$ are not considered in this step. If the background correction point $BC_3$ thus found is not the last point in the selected region, one or more additional background correction points are then determined in the same way as described above for finding $BC_3$, where the gradient is taken of straight lines between the background correction point just identified and each subsequent measured data point in the series.

Hence the method of deriving background correction points may be described as follows, acting upon n points $P_n$, which make up the selected portion of measured emission spectrum, the points consisting of intensity values $I_n$ at discrete wavelengths or values corresponding to wavelength $\lambda_n$:

Step (a): $BC_1 =: P_1$
Step (b): $i =: 1$
Step (c): For each subsequent data point $P_m$, where m=i+1 . . . n, calculate the gradient $G_m$ of the line between the previous background correction point $BC_i$ and $P_m$, where $$G_m = \frac{I_m - I_i}{|\lambda_m - \lambda_i|}$$

and ($I_m, \lambda_m$) are the intensity and value corresponding to wavelength for the point $P_m$, and ($I_i, \lambda_i$) are the intensity and value corresponding to wavelength for the point $BC_i$ Step (d) $i =: i+1$
Step (e): $BC_i = P_k$, where $G_k$ is the minimum gradient
Step (f): If $B_i$ is not the last data point, i.e. $BC_i \neq P_n$, repeat from step (c); otherwise terminate.

The background correction points thus identified are then used in a background correction function which is applied to the portion of the measured emission spectrum to produce a background-corrected portion of the emission spectrum. The background correction function is preferably a mathematical function which is fitted to the background correction points.

The mathematical function may be a curve or it may be a straight line. In a preferred embodiment the background correction function is a combination of straight line functions taken between the each successive pair of background correction points. In this case, the background correction function is applied to any point $P_k$ lying between a pair of background correction points by subtracting a background $B_k$ from $I_k$, the intensity at point $P_k$. $B_k$ is derived by linear interpolation of the straight line function taken between the pair of background correction points which lie either side of point $P_k$. This linear interpolation technique amounts to fitting a linear background correction function between adjacent background points which bound a range of wavelengths or values corresponding to wavelengths of interest. In this case it is assumed that an emission spectrum consists only of additive features and that over the width of a spectral line, the continuum background is modeled adequately by a straight line.

Where the background correction function is a curve, preferably the curve is fitted to three or more background correction points. The curve may be a spline fit, for example. Where the background correction function is a curve, the background correction function is applied to any point $P_k$ lying within the wavelength or values corresponding to wavelength bounds of the fitted curve by subtracting a background $B_k$ from $I_k$, $I_k$ being the intensity at point $P_k$, and $B_k$ being derived from the intensity ordinate of the fitted curve at the wavelength or value corresponding to wavelength $\lambda_k$.

Preferably all the points $P_n$ which lie within the portion of the measured emission spectrum are thus background-corrected producing a background-corrected portion of the emission spectrum, which may then be further processed.

Preferably all selected portions of the emission spectrum are subjected to the above background correction method. The method may be applied to just the first detected spectrum in a series of analyses or to each subsequent spectrum as it is produced.

The method can be refined by allowing "roll-up" at the first and last data points in a portion of the emission spectrum to ensure that at least one intermediate background correction point is identified. The reason this may be required is that some spectral lines of interest lie beside molecular emission bands, and a graph of wavelength or values corresponding to wavelength against intensity shows a slight dip at either end. In this case only two background correction points are found by the method of the invention. Then, use of a linear interpolation function as the background correction function would effectively create a single straight line drawn from one edge of the portion of the measured emission spectrum to the other, giving an inaccurate estimate of the background, due to the presence of the molecular emission bands. The roll-up feature guarantees that at least one intermediate data point of the emission spectrum is used as a background correction point, eliminating this problem.

The roll-up method is used if the method of finding the background correction points only finds the first and last data points in the portion of measured emission spectrum. In this case, the method of finding the background correction points is followed again using a subset of the portion of measured spectral data, the subset being all points from and including the second data point to the next-to-last data point. Additional background correction points are then found and added to the original two background correction points found.

An alternative to the roll-up method is to apply the original method twice, once from the top of the peak to the first data point and once from the top of the peak to the last data point, to produce two sets of background correction points. The first background correction point in each set (corresponding to the data point on the peak top) is discarded, and the two sets of background correction points are then combined to provide a single set of background correction points. The background correction function is then derived from the background correction points in the single set.

Hence the invention further provides a method for deriving a background-corrected portion of a measured emission spectrum wherein if the background correction points identified consist only of the first and last data points in the portion of measured emission spectrum, the method further comprises:
(i) performing steps (1) to (4) from the top of the peak to the first data point to identify a first set of background correction points;
(ii) performing steps (1) to (4) from the top of the peak to the last data point, to identify a second set of background correction points;
(iii) discarding the first background correction point in the first set of background correction points and discarding the first background correction point in the second set of background correction points;
(iv) combining the two sets of background correction points to provide a single set of background correction points;
(v) deriving a background correction function fitted to the identified background correction points in the single set, and
(vi) applying the background correction function to the portion of the measured emission spectrum so as to produce a background-corrected portion of the emission spectrum.

The method of the present invention provides background-corrected portions of a measured emission spectrum which allow a good estimate of the true intensity value at a particular wavelength or value corresponding to wavelength of interest to be obtained. The method is rapid, robust, may be fully automated, and is less susceptible to noise. The method provides a means of automatically identifying background points to allow a background correction to be applied to a portion of an emission spectrum. The method may be applied to data measured in real time, or it may be applied to data gathered previously. It may therefore be applied to archived data to obtain improved estimates of spectral intensity from data recorded before the invention was made. It may also be applied to data acquired by instrumentation at locations remote from the location at which the method of the invention is performed. Accordingly independent aspects of the invention do not include the step of measuring the spectral data.

Further details of the means by which the invention provides these, and other, advantages are given in the description below.

The invention is preferably at least partially implemented on a computer, especially the data processing steps. Accordingly, the invention may utilise a computer readable medium carrying a computer program, the program having modules of program code for carrying out the method of the invention. A computer may be used to read the computer readable medium and perform some or all the steps of the method of the invention by using the modules of program code.

The method preferably further comprises outputting the background-corrected portion of the spectrum. Correspondingly, the system preferably further comprises an outputting device for outputting the background-corrected portion of the spectrum. The outputting device may comprise an electronic display device (e.g. VDU screen) and/or a printer, the outputting device preferably being under the control of the computer that is used to implement the invention. In this way, a tangible (user readable) form of the background-corrected portion of the spectrum is produced, e.g. on a display or on paper.

In a further aspect of the present invention, there is provided a system for determining a background-corrected portion of a measured emission spectrum, comprising a computer having an input for receiving a portion of measured emission spectrum data, and an output for outputting the background-corrected portion of a measured emission spectrum derived by the computer from the portion of measured emission spectrum data; wherein the computer is programmed with a program comprising one or more modules of program code for identifying two or more background correction points from the portion of the measured emission spectrum; one or more modules of program code for deriving a background correction function fitted to the identified background correction points, and one or more modules of program code for applying the background correction function to the portion of the measured emission spectrum so as to produce a background-corrected portion of the emission spectrum; wherein the portion of measured emission spectrum comprises measured data points which consist of a series of n intensity values $I_n$, at discrete wavelengths or values corresponding to wavelength $\lambda_n$, the series extending from a first measured data point to a last measured data point, and the background correction points are identified from the measured data points by the following steps:
(1) identifying a first background correction point as the first measured data point;
(2) calculating the gradients $G_m$ of straight lines between the background correction point just identified and each subsequent measured data point in the series;
(3) identifying a next background correction point as the measured data point which lies on the straight line which has the minimum gradient of all the calculated gradients $G_m$;
(4) if the background correction point just identified does not lie at the last measured data point, repeat the procedure from step (2) until it does.

The system may further comprise an inductively coupled plasma optical emission spectrometer, or a microwave induced plasma optical emission spectrometer.

While shown and described herein as a method and system for determining a background-corrected portion of a measured emission spectrum, it is understood that aspects of the invention further provide various alternative embodiments. For example, in one embodiment, the invention provides a computer program fixed in at least one computer-readable medium, which when executed, enables a computer system to determine a background-corrected portion of a measured emission spectrum. To this extent, the computer-readable medium includes program code which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In order to further understand the invention, embodiments will now be described in more detail with reference to the accompanying drawings. The embodiments described are examples and for illustration only and are not intended to, and do not, limit the scope of the invention.

DETAILED DESCRIPTION

Figure 1:
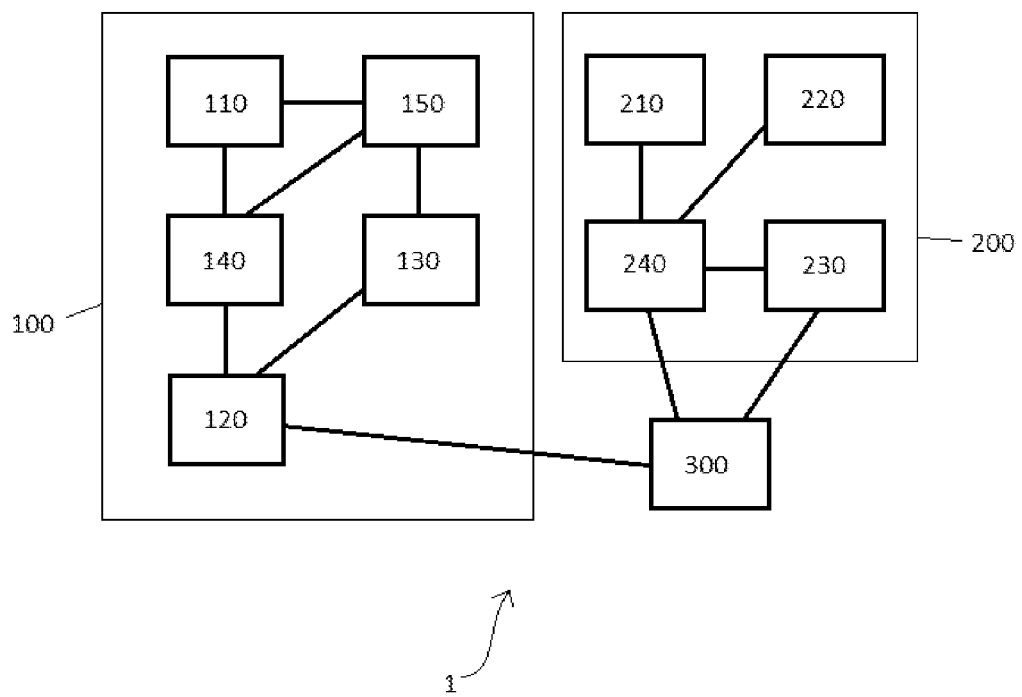
FIG. 1 is a schematic depiction of a system according to the present invention.

FIG. 1 is a schematic depiction of a system 1 of the present invention. System 1 comprises an optical emission source 100, and a spectrometer 200. Optical emission source 100 may be any form of optical emission source, including but not limited to inductively coupled plasma and microwave induced plasma sources. In this example optical emission source 100 comprises an inductively coupled plasma optical emission source. Inductively coupled plasma optical emission source 100 further comprises a sample introduction system 110, a source control system 120, a RF generator 130, a gas control system 140, and a torch 150. Sample introduction system 110 comprises liquid sample uptake apparatus, a nebuliser and a spray chamber for creating a stream of droplets of sample and delivering the stream into torch 50, utilizing gas controlled by gas control system 140. Torch 150 is a conventional inductively coupled plasma torch as is known in the art. Torch 150 has an exit end placed within a multi-turn load coil which is driven with 27 MHz RF power from RF generator 130. RF generator 130 is controlled by source control system 120. When in operation, sample is drawn into the nebuiser and a stream of droplets of sample are created and directed into a spray chamber which filters the droplet stream, allowing droplets below a size limit to be transported within a gas stream into a central input channel of torch 150. Two concentric outer channels of torch 150 are fed with gas through two further inputs and a RF plasma is created within the gas at the exit end of the torch by RF power driven through the load coil. Droplets of sample are directed into the heart of the plasma, are desolvated, atomized and partially ionized, and excited to emit photons by the heat of the plasma. The optical emission radiates from the plasma and a portion is intercepted by spectrometer 200.

Spectrometer 200 comprises a lens system and polychromator 210, a detector 220, a data processing unit 230 and a spectrometer controller 240. The lens system captures the portion of optical emission intercepted by the spectrometer 200 and directs it onto the polychromator. The polychromator disperses the optical emission as a function of the wavelength of the photons. Dispersed photons are intercepted by detector 220 which comprises an array of light sensitive detection elements. Information on the intensity at different wavelengths is received from the detector 220 by data processing unit 230. Spectrometer 200 is controlled by spectrometer controller 240.

Optical emission source 100 and spectrometer 200 are controlled by a computer 300. Computer 300 is in communication with source control system 120 and spectrometer controller 240. Computer 300 also receives information from data processing unit 230.

System 1 is configured for determining a background-corrected portion of a measured emission spectrum in accordance with the present invention. Computer 300 comprises a computer-readable medium which includes program code which when performed by computer 300 implements the method of the invention.

Figure 2A:
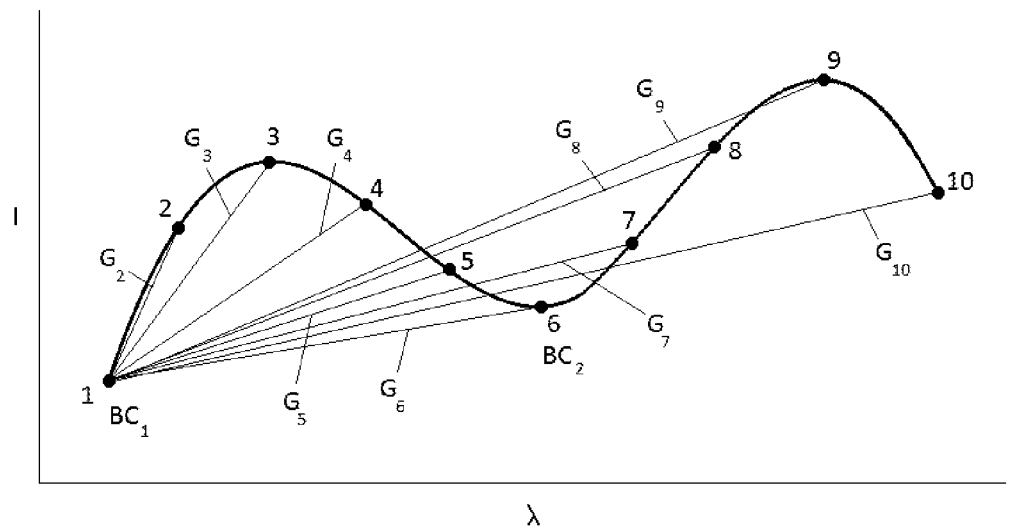
FIG. 2 is a graph of a portion of measured emission spectrum annotated to show application of the present invention, comprising FIGS. 2a, 2b and 2c.
Figure 2B:
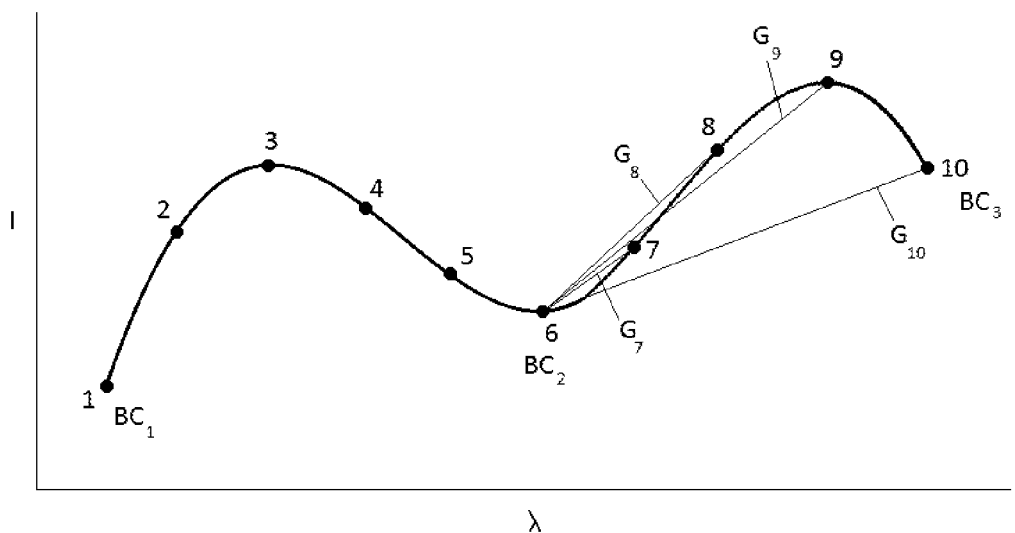
Figure 2C:
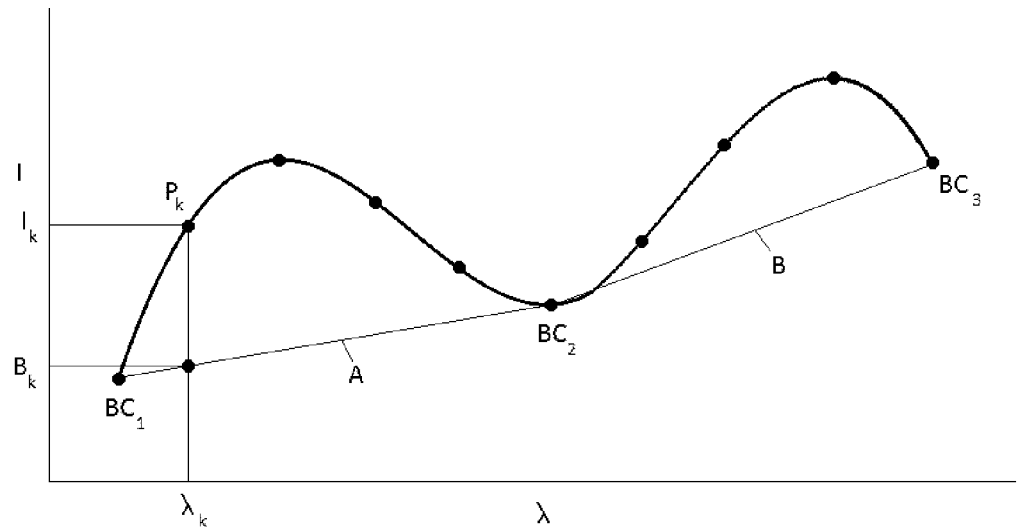

FIG. 2 is a plot of a portion of measured emission spectrum annotated to show application of the present invention. FIG. 2 is a graph of emission intensity, I, vs. wavelength, $\lambda$, comprising 10 points ($\lambda_n$, $I_n$), where n=1 to 10, labeled 1 to 10 in the figure, the data points having been detected by spectrometer 200 shown in FIG. 1. Background correction points are identified according to the method of the invention as follows. A first measured data point is chosen to be point 1 and a last measured data point is then point 10. The first point data point 1 is identified as a first background correction point $BC_1$. As shown in FIG. 2a, gradients $G_2$, $G_3$, $G_4$, $G_5$, $G_6$, $G_7$, $G_8$, $G_9$ and $G_{10}$ are calculated between $BC_1$ each successive measured data point. The minimum gradient is identified as $G_6$, and data point 6 is identified as a second background correction point $BC_2$. $BC_2$ is not the last measured data point (point 10), hence the method proceeds to identify one or more additional background correction points. As shown in FIG. 2b, gradients $G_7$, $G_8$, $G_9$ and $G_{10}$ are calculated between $BC_2$ each successive measured data point. The minimum gradient is identified as $G_{10}$, and data point 10 is identified as a third background correction point $BC_3$. $BC_3$ is the last measured data point (point 10), hence the method terminates, having found three background correction points. These background correction points are shown in FIG. 2c.

Figure 3:
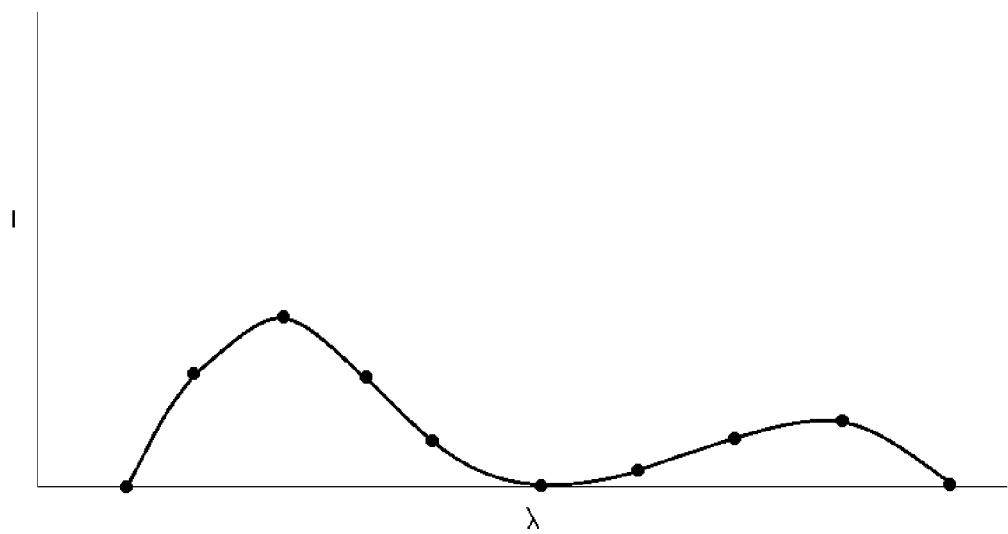
FIG. 3 is a graph of a background-corrected portion of the emission spectrum formed from the measured data shown in FIG. 2 using the method of the invention.

A background correction function is derived, fitted to the identified background correction points, the background correction function being in this example a combination of straight line functions, A and B, taken between the each successive pair of background correction points, as shown in FIG. 2c. In this case, the background correction function is applied to any point $P_k$ lying between a pair of background correction points by subtracting a background $B_k$ from $I_k$, the intensity at point $P_k$. $B_k$ is derived by linear interpolation of the straight line function taken between the pair of background correction points which lie either side of point $P_k$, which as shown in FIG. 2c are points $BC_1$ and $BC_2$. The result of applying this background correction function to all points 1 to 10 is shown in FIG. 3, where the resultant background-corrected portion of the emission spectrum is shown.

An alternative background correction function could be used, in which the background correction function is a curve fitted to the three background correction points. The curve may be a spline fit, for example. In this case, the background correction function is applied to any point $P_k$ lying within the wavelength or values corresponding to wavelength bounds of the fitted curve by subtracting a background $B_k$ from $I_k$, $I_k$ being the intensity at point $P_k$, and $B_k$ being derived from the intensity ordinate of the fitted curve at the wavelength or value corresponding to wavelength $\lambda_k$.

Figure 4:
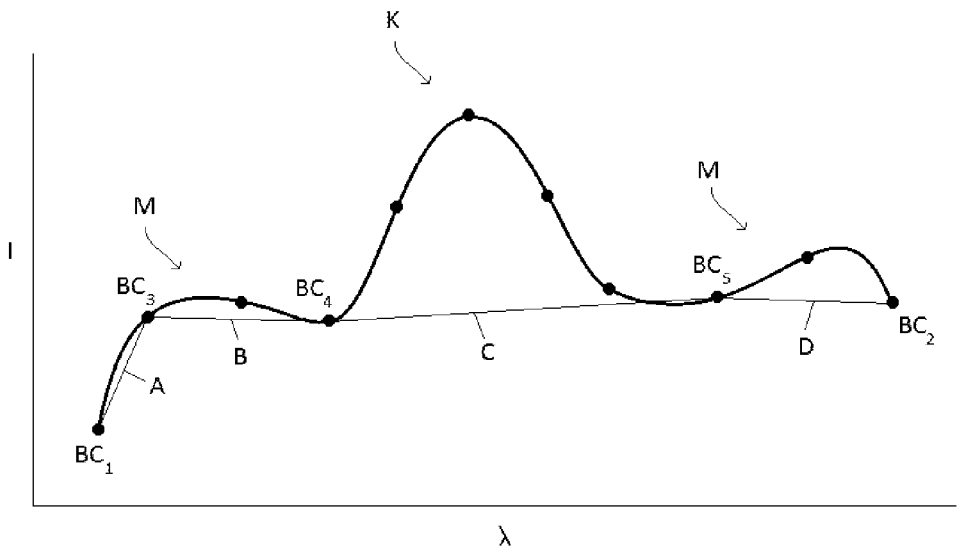
FIG. 4 is a graph of a portion of measured emission spectrum annotated to show application of the present invention in the case where a spectral line is present together with two molecular emission bands.

FIG. 4 shows an example of a portion of a measured emission spectrum comprising one spectral line, K and two molecular emission bands, M. In this example, the method of the invention finds only two background correction points, $BC_1$ and $BC_2$, and these lie at the first and last measured data points. According to a refinement to the invented method, the roll-up feature is in this case used. The method of finding the background correction points is followed again using a subset of the portion of measured spectral data, the subset being all points from and including the second data point to the next-to-last data point. Additional background correction points $BC_3$, $BC_4$ and $BC_5$ are then found and added to the original two background correction points found. A background correction function is derived, fitted to the identified background correction points, the background correction function being in this example a combination of straight line functions, A, B, C and D, taken between each successive pair of background correction points, as shown in FIG. 4. A background-corrected portion of emission spectrum is then formed in the same as way described in relation to FIG. 2.

Figure 5:
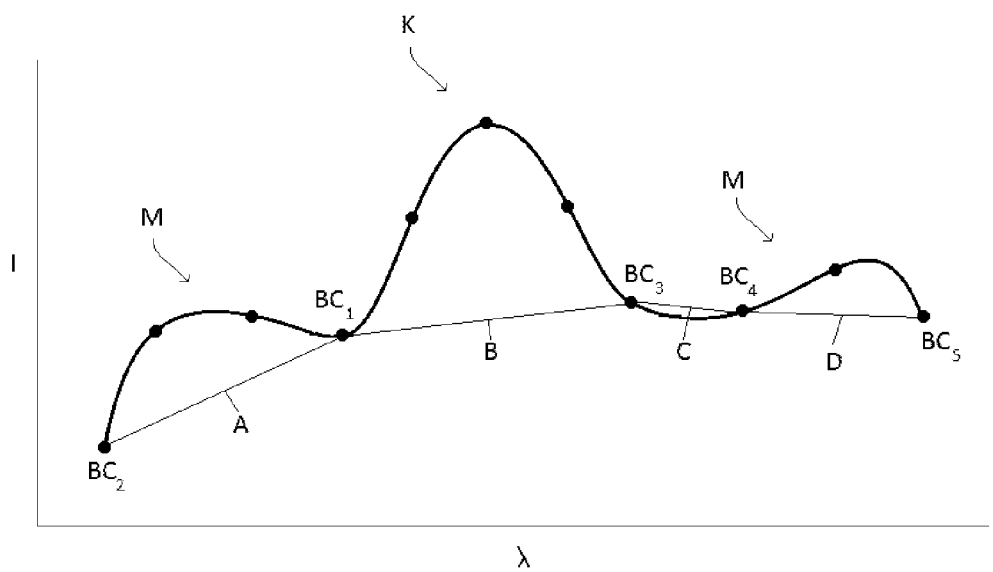
FIG. 5 is a graph of a portion of measured emission spectrum annotated to show the application of the alternative to the roll up procedure in the case where a spectral line is present together with two molecular emission bands.

FIG. 5 shows the alternative to the roll up procedure applied to the same portion of emission spectrum as shown in FIG. 4 (one spectral line, K, and two molecular emission bands, M). In this example the original method is applied from the apex of the peak to the first data point (on the left edge of the portion of emission spectrum), and then the first point (being the data point on the top of the peak K) is discarded, resulting in background correction points $BC_1$ and $BC_2$. The process is then repeated from the apex of the peak to the last data point (on the right edge of the portion of emission spectrum) and again the first point (being the data point on the top of the peak K) is discarded resulting in background correction points $BC_3$, $BC_4$ and $BC_5$. The two sets of background points are combined to form a single set of background correction points. The background function is then fitted to the identified background points of the single set, the background correction function being in this example being a combination of straight line functions A, B, C and D taken between each successive pair of background correction points as shown in FIG. 5. A background-corrected portion of emission spectrum is then formed in the same as way described in relation to FIG. 2.

As used herein, including in the claims, unless the context indicates otherwise, singular forms of the terms herein are to be construed as including the plural form and vice versa.

Throughout the description and claims of this specification, the words "comprise", "including", "having" and "contain" and variations of the words, for example "comprising" and "comprises" etc, mean "including but not limited to", and are not intended to (and do not) exclude other components.

It will be appreciated that variations to the foregoing embodiments of the invention can be made while still falling within the scope of the invention. Each feature disclosed in this specification, unless stated otherwise, may be replaced by alternative features serving the same, equivalent or similar purpose. Thus, unless stated otherwise, each feature disclosed is one example only of a generic series of equivalent or similar features.

The use of any and all examples, or exemplary language ("for instance", "such as", "for example" and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

The invention claimed is:

1. A method for deriving a background-corrected portion of a measured emission spectrum, for determining concentration of an element in a sample, comprising the steps of:
    acquiring the portion of the measured emission spectrum;
    identifying two or more background correction points from the portion of the measured emission spectrum;
    deriving a background correction function fitted to the identified background correction points,
    applying the background correction function to the portion of the measured emission spectrum so as to produce a background-corrected portion of the emission spectrum; wherein
    the portion of the measured emission spectrum comprises measured data points which consist of a series of n intensity values $I_n$, at discrete wavelengths or values corresponding to wavelength $\lambda_n$, the series extending from a first measured data point to a last measured data point, and
    the background correction points are identified from the measured data points by the following steps:
        (1) identifying a first background correction point as the first measured data point;
        (2) calculating the gradients $G_m$ of straight lines between the background correction point just identified and each subsequent measured data point in the series;
        (3) identifying a next background correction point as the measured data point which lies on the straight line which has the minimum gradient of all the calculated gradients $G_m$;
        (4) if the background correction point just identified does not lie at the last measured data point, repeat the procedure from step (2) until it does; and
    determining the element concentration in the sample using the background-corrected portion of the emission spectrum.

2. The method of claim 1 wherein the background correction function is a mathematical function which is fitted to the background correction points and the mathematical function is a combination of straight line functions taken between each successive pair of background correction points lying across the portion of measured emission spectrum.

3. The method of claim 2 wherein the background correction function is applied to any point $P_k$ lying between a pair of background correction points by subtracting a background $B_k$ from $I_k$, the intensity at point $P_k$, wherein $B_k$ is derived by linear interpolation of the straight line function taken between the pair of background correction points which lie either side of point $P_k$.

4. The method of claim 1 wherein the background correction function is a mathematical function which is fitted to the background correction points and the mathematical function is a curve fitted to three or more background correction points.

5. The method of claim 4 wherein the background correction function is applied to any point $P_k$ lying within the wavelength or values corresponding to wavelength bounds of the fitted curve by subtracting a background $B_k$ from $I_k$, $I_k$ being the intensity at point $P_k$, and $B_k$ being derived from the intensity ordinate of the fitted curve at the wavelength or value corresponding to wavelength $\lambda_k$.

6. The method of claim 1 wherein the background correction function is applied to all the points in the portion of the measured emission spectrum.

7. The method of claim 1 wherein gradients are calculated according to the function $$G_m = \frac{I_m - I_i}{|\lambda_m - \lambda_i|}$$

where $(I_m,\lambda_m)$ are the intensity and value corresponding to wavelength of subsequent measured data point $P_m$, and $(I_i,\lambda_i)$ are the intensity and value corresponding to wavelength of the background correction point just identified.

8. The method of claim 1 wherein if the background correction points identified consist only of the first and last data points in the portion of measured emission spectrum, steps (1) to (4) are followed again using a subset of the portion of measured spectral data, the subset being all points from and including the second data point to the next-to-last data point, and additional background correction points thus identified together with the first and last data points in the portion of measured emission spectrum are used to derive the background correction function.

9. The method of claim 1 wherein if the background correction points identified consist only of the first and last data points in the portion of measured emission spectrum, the method further comprises:
(i) performing steps (1) to (4) from the top of a peak of the emission spectrum to the first data point to identify a first set of background correction points;
(ii) performing steps (1) to (4) from the top of the peak of the emission spectrum to the last data point, to identify a second set of background correction points;
(iii) discarding the first background correction point in the first set of background correction points and discarding the first background correction point in the second set of background correction points;
(iv) combining the two sets of background correction points to provide a single set of background correction points;
(v) deriving a background correction function fitted to the identified background correction points in the single set, and (vi) applying the background correction function to the portion of the measured emission spectrum so as to produce a background-corrected portion of the emission spectrum.

10. The method of claim 1 wherein the portion of measured spectral data is identified from a larger set of measured spectral data by a method of peak detection.

11. The method of claim 1 further comprising measuring spectral data prior to identifying one or more portions of the measured spectral data.

12. The method of claim 11 wherein the measured spectral data is measured using an inductively coupled plasma optical emission spectrometer.

13. The method of claim 11 wherein the measured spectral data is measured using a microwave induced plasma optical emission spectrometer.

14. A non transitory computer readable medium encoding a computer program for deriving a background-corrected portion of a measured emission spectrum, for determining concentration of an element in a sample, by performing the steps of:
acquiring the portion of the measured emission spectrum;
identifying two or more background correction points from the portion of the measured emission spectrum;
deriving a background correction function fitted to the identified background correction points;
applying the background correction function to the portion of the measured emission spectrum so as to produce a background-corrected portion of the emission spectrum; wherein
the portion of the measured emission spectrum comprises measured data points which consist of a series of n intensity values $I_n$, at discrete wavelengths or values corresponding to wavelength $\lambda_n$, the series extending from a first measured data point to a last measured data point, and
the background correction points are identified from the measured data points by the following steps:
(1) identifying a first background correction point as the first measured data point;
(2) calculating the gradients $G_m$ of straight lines between the background correction point just identified and each subsequent measured data point in the series;
(3) identifying a next background correction point as the measured data point which lies on the straight line which has the minimum gradient of all the calculated gradients $G_m$;
(4) if the background correction point just identified does not lie at the last measured data point, repeat the procedure from step (2) until it does; and
determining the element concentration in the sample using the background-corrected portion of the emission spectrum.

15. A system for determining a background-corrected portion of a measured emission spectrum, comprising:
a computer having an input for receiving a portion of measured emission spectrum data, and an output for outputting the background-corrected portion of a measured emission spectrum, for determining concentration of an element in a sample, derived by the computer from the portion of measured emission spectrum data;
wherein the computer is programmed with a program comprising:
one or more modules of program code for identifying two or more background correction points from the portion of the measured emission spectrum;

one or more modules of program code for deriving a background correction function fitted to the identified background correction points;

one or more modules of program code for applying the background correction function to the portion of the measured emission spectrum so as to produce a background-corrected portion of the emission spectrum; wherein the portion of the measured emission spectrum comprises measured data points which consist of a series of n intensity values $I_n$, at discrete wavelengths or values corresponding to wavelength $\lambda_n$, the series extending from a first measured data point to a last measured data point, and the background correction points are identified from the measured data points by the following steps:

(1) identifying a first background correction point as the first measured data point;

(2) calculating the gradients $G_m$ of straight lines between the background correction point just identified and each subsequent measured data point in the series;

(3) identifying a next background correction point as the measured data point which lies on the straight line which has the minimum gradient of all the calculated gradients $G_m$;

(4) if the background correction point just identified does not lie at the last measured data point, repeat the procedure from step (2) until it does; and determining the element concentration in the sample using the background-corrected portion of the emission spectrum.

16. The system of claim 15 further comprising an inductively coupled plasma optical emission spectrometer.

17. The system of claim 15 further comprising a microwave induced plasma optical emission spectrometer.

* * * * *